(12) United States Patent
Connolly et al.

(10) Patent No.: US 7,702,767 B2
(45) Date of Patent: Apr. 20, 2010

(54) USER CONNECTIVITY PROCESS MANAGEMENT SYSTEM

(75) Inventors: John Connolly, London (GB); Premila Vekaria, London (GB)

(73) Assignee: JP Morgan Chase Bank, New York, NY (US)

( * ) Notice: Subject to any disclaimer, the term of this patent is extended or adjusted under 35 U.S.C. 154(b) by 1130 days.

(21) Appl. No.: 10/888,923

(22) Filed: Jul. 9, 2004

(65) Prior Publication Data

US 2005/0204029 A1 Sep. 15, 2005

Related U.S. Application Data

(60) Provisional application No. 60/551,436, filed on Mar. 9, 2004.

(51) Int. Cl.
*G06F 15/173* (2006.01)
*G06Q 40/00* (2006.01)
*G06Q 20/00* (2006.01)

(52) U.S. Cl. ........................ 709/223; 705/35; 705/37; 705/64; 705/75; 705/77

(58) Field of Classification Search ............... 709/223; 705/35, 37, 64–69, 75, 77–79
See application file for complete search history.

(56) References Cited

U.S. PATENT DOCUMENTS

| | | | |
|---|---|---|---|
| 4,751,702 A | 6/1988 | Beier et al. | |
| 5,027,269 A | 6/1991 | Grant et al. | |
| 5,075,881 A | 12/1991 | Blomberg et al. | |
| 5,301,320 A | 4/1994 | McAtee et al. | ............... 395/650 |
| 5,313,616 A | 5/1994 | Cline et al. | |
| 5,347,518 A | 9/1994 | Lee | |
| 5,386,551 A | 1/1995 | Chikira et al. | |
| 5,446,895 A | 8/1995 | White et al. | |
| 5,539,885 A | 7/1996 | Ono et al. | |
| 5,549,117 A | 8/1996 | Tacklind et al. | |
| 5,563,998 A | 10/1996 | Yaksih et al. | |
| 5,566,297 A | 10/1996 | Devarakonda | |
| 5,594,863 A | 1/1997 | Stiles | |
| 5,630,047 A | 5/1997 | Wang | |

(Continued)

FOREIGN PATENT DOCUMENTS

WO WO 01/74043 10/2001

OTHER PUBLICATIONS

Agostini, et al., "A Light Workflow Management System Using Simple Process Models", Computer Supported Cooperative Work, V. 9 N. 3-4, p. 335-363, Aug. 2000.

(Continued)

*Primary Examiner*—George C Neurauter, Jr.
*Assistant Examiner*—Kishin G Belani
(74) *Attorney, Agent, or Firm*—Lowenstein Sandler PC

(57) ABSTRACT

A system is disclosed according to the present invention that manages the process of providing a client access to a secured service. In the exemplary embodiment, the secured service is a computer system that allows the client to trade financial instruments. Management of this process includes managing execution of tasks that can be automatically executed and delegating tasks that require manual execution; communicating with entities outside of the process management system; and handling "demands," or unexpected problems that arise in the middle of the client connectivity process.

3 Claims, 22 Drawing Sheets

U.S. PATENT DOCUMENTS

| | | | |
|---|---|---|---|
| 5,630,069 A | 5/1997 | Flores et al. ................. 395/207 |
| 5,655,074 A | 8/1997 | Rauscher |
| 5,701,471 A | 12/1997 | Subramanyam |
| 5,712,971 A | 1/1998 | Stanfill et al. |
| 5,721,913 A | 2/1998 | Ackroff et al. ............... 395/614 |
| 5,721,914 A | 2/1998 | De Vries |
| 5,748,878 A | 5/1998 | Rees et al. |
| 5,752,034 A | 5/1998 | Srivastava |
| 5,758,061 A | 5/1998 | Plum |
| 5,768,506 A | 6/1998 | Randell ................. 395/200.32 |
| 5,781,448 A | 7/1998 | Nakamura et al. |
| 5,784,562 A | 7/1998 | Diener |
| 5,799,297 A | 8/1998 | Goodridge et al. .............. 707/1 |
| 5,806,075 A | 9/1998 | Jain et al. |
| 5,828,883 A | 10/1998 | Hall |
| 5,835,770 A | 11/1998 | Shum et al. |
| 5,842,196 A | 11/1998 | Agarwal et al. |
| 5,845,292 A | 12/1998 | Bohannon et al. |
| 5,872,976 A | 2/1999 | Yee et al. |
| 5,884,037 A | 3/1999 | Aras et al. |
| 5,903,721 A | 5/1999 | Sixtus |
| 5,903,897 A | 5/1999 | Carrier, III et al. |
| 5,920,719 A | 7/1999 | Sutton et al. |
| 5,937,198 A | 8/1999 | Nelson et al. |
| 5,960,196 A | 9/1999 | Carrier, III et al. |
| 5,960,445 A | 9/1999 | Tamori et al. |
| 5,995,965 A | 11/1999 | Experton |
| 6,003,075 A | 12/1999 | Arendt et al. |
| 6,009,274 A | 12/1999 | Fletcher et al. |
| 6,026,237 A | 2/2000 | Berry et al. |
| 6,028,938 A | 2/2000 | Malkin et al. |
| 6,029,002 A | 2/2000 | Afifi et al. |
| 6,058,393 A | 5/2000 | Meier et al. |
| 6,061,503 A | 5/2000 | Chamberlain |
| 6,061,686 A | 5/2000 | Gauvin et al. |
| 6,067,412 A | 5/2000 | Blake et al. |
| 6,073,107 A | 6/2000 | Minkiewicz et al. |
| 6,088,700 A | 7/2000 | Larsen et al. |
| 6,101,601 A | 8/2000 | Matthews et al. |
| 6,105,089 A | 8/2000 | Chari et al. |
| 6,108,673 A | 8/2000 | Brandt et al. |
| 6,125,390 A | 9/2000 | Touboul |
| 6,128,708 A | 10/2000 | Fitzpatrick et al. |
| 6,138,112 A | 10/2000 | Slutz |
| 6,145,121 A | 11/2000 | Levy et al. |
| 6,161,139 A * | 12/2000 | Win et al. ................... 709/225 |
| 6,167,534 A | 12/2000 | Straathof et al. |
| 6,175,833 B1 | 1/2001 | West et al. |
| 6,195,676 B1 | 2/2001 | Spix et al. |
| 6,230,319 B1 | 5/2001 | Britt, Jr. et al. |
| 6,237,035 B1 | 5/2001 | Himmel et al. |
| 6,237,143 B1 | 5/2001 | Fontana et al. |
| 6,243,862 B1 | 6/2001 | Lebow |
| 6,247,029 B1 | 6/2001 | Kelley et al. |
| 6,249,877 B1 | 6/2001 | Kawakami et al. |
| 6,269,479 B1 | 7/2001 | Puram |
| 6,279,039 B1 | 8/2001 | Bhat et al. |
| 6,301,701 B1 | 10/2001 | Walker et al. |
| 6,311,327 B1 | 10/2001 | O'Brien et al. |
| 6,363,499 B1 | 3/2002 | Delo et al. |
| 6,363,524 B1 | 3/2002 | Loy |
| 6,405,250 B1 | 6/2002 | Lin et al. |
| 6,405,364 B1 | 6/2002 | Bowman-Amuah |
| 6,411,910 B1 | 6/2002 | Eulau et al. |
| 6,424,981 B1 | 7/2002 | Isaac et al. |
| 6,430,687 B1 | 8/2002 | Aguilar et al. |
| 6,438,749 B1 | 8/2002 | Chamberlain |
| 6,446,126 B1 | 9/2002 | Huang et al. |
| 6,463,454 B1 | 10/2002 | Lumelsky et al. |
| 6,466,980 B1 | 10/2002 | Lumelsky et al. |
| 6,467,052 B1 | 10/2002 | Kaler et al. |
| 6,470,464 B2 | 10/2002 | Bertram et al. |
| 6,477,471 B1 | 11/2002 | Hedstrom et al. |
| 6,502,207 B1 | 12/2002 | Itoh et al. |
| 6,505,176 B2 | 1/2003 | DeFrancesco, Jr. et al. ... 705/38 |
| 6,513,154 B1 | 1/2003 | Porterfield |
| 6,519,763 B1 | 2/2003 | Kaufer et al. |
| 6,526,443 B1 | 2/2003 | Goldsmith et al. .......... 709/224 |
| 6,546,506 B1 | 4/2003 | Lewis |
| 6,560,580 B1 | 5/2003 | Fraser et al. ................... 705/37 |
| 6,578,004 B1 | 6/2003 | Cimral et al. |
| 6,578,006 B1 | 6/2003 | Saito et al. ..................... 705/9 |
| 6,584,447 B1 | 6/2003 | Fox et al. |
| 6,587,841 B1 | 7/2003 | DeFrancesco et al. ......... 705/38 |
| 6,601,017 B1 | 7/2003 | Kennedy et al. |
| 6,601,018 B1 | 7/2003 | Logan |
| 6,601,233 B1 | 7/2003 | Underwood |
| 6,626,953 B2 | 9/2003 | Johndrew et al. |
| 6,629,266 B1 | 9/2003 | Harper et al. |
| 6,687,817 B1 | 2/2004 | Paul |
| 6,820,088 B1 | 11/2004 | Hind et al. |
| 6,920,467 B1 | 7/2005 | Yoshimoto |
| 6,934,934 B1 | 8/2005 | Osborne, II et al. |
| 6,968,571 B2 * | 11/2005 | Devine et al. ................. 726/11 |
| 7,085,997 B1 * | 8/2006 | Wu et al. .................... 715/201 |
| 7,185,364 B2 | 2/2007 | Knouse et al. |
| 7,228,461 B2 * | 6/2007 | Krietemeyer et al. ......... 714/45 |
| 7,237,257 B1 * | 6/2007 | Hirsh .......................... 726/10 |
| 7,293,098 B2 | 11/2007 | Sandhu et al. |
| 7,310,659 B1 * | 12/2007 | George ....................... 709/206 |
| 7,317,732 B2 | 1/2008 | Mills et al. |
| 7,328,333 B2 | 2/2008 | Kawano et al. |
| 7,340,430 B2 | 3/2008 | Mulinder et al. |
| 7,363,363 B2 | 4/2008 | Dal Canto et al. |
| 7,496,950 B2 | 2/2009 | Carley |
| 2002/0004912 A1 | 1/2002 | Fung |
| 2002/0016818 A1 * | 2/2002 | Kirani et al. ................. 709/203 |
| 2002/0029194 A1 * | 3/2002 | Lewis et al. .................... 705/39 |
| 2002/0073018 A1 * | 6/2002 | Mulinder et al. .............. 705/37 |
| 2002/0083213 A1 * | 6/2002 | Oberstein et al. ........... 709/313 |
| 2002/0133593 A1 | 9/2002 | Johnson et al. |
| 2002/0133757 A1 | 9/2002 | Bertram et al. |
| 2002/0138571 A1 | 9/2002 | Trinon et al. |
| 2002/0143929 A1 | 10/2002 | Maltz et al. |
| 2002/0147961 A1 | 10/2002 | Charters et al. |
| 2002/0162090 A1 | 10/2002 | Parnell et al. |
| 2002/0165754 A1 | 11/2002 | Tang et al. |
| 2002/0194370 A1 | 12/2002 | Voge |
| 2003/0004848 A1 | 1/2003 | Hellerstein et al. |
| 2003/0018952 A1 | 1/2003 | Roetzheim |
| 2003/0033586 A1 | 2/2003 | Lawler |
| 2003/0041000 A1 | 2/2003 | Zajac et al. ................... 705/37 |
| 2003/0065644 A1 | 4/2003 | Horman et al. |
| 2003/0077559 A1 | 4/2003 | Braunberger et al. |
| 2003/0120539 A1 | 6/2003 | Korium et al. |
| 2003/0144868 A1 | 7/2003 | MacIntyre et al. |
| 2003/0167223 A1 * | 9/2003 | Pledereder et al. ............ 705/37 |
| 2003/0188290 A1 | 10/2003 | Corral |
| 2003/0196190 A1 | 10/2003 | Ruffolo et al. |
| 2003/0212518 A1 | 11/2003 | DæAlessandro et al. |
| 2003/0216990 A1 * | 11/2003 | Star ............................ 705/35 |
| 2003/0217166 A1 * | 11/2003 | Dal Canto et al. ............ 709/229 |
| 2003/0225662 A1 | 12/2003 | Horan et al. ................. 705/36 |
| 2003/0225663 A1 | 12/2003 | Horan et al. ................. 705/36 |
| 2003/0233583 A1 * | 12/2003 | Carley ....................... 713/201 |
| 2005/0055555 A1 | 3/2005 | Rao et al. |
| 2005/0071807 A1 | 3/2005 | Yanai |

OTHER PUBLICATIONS

"Business Process Automation and Workflow in the Financial Industry" CSK White Paper, Ver. 3.1, CSK Software AG, Sep. 10, 2003.

Muehlen, M.Z., "Business Process Modeling and Workflow Management" Department of Information Systems, University of Muenster, Fall Semester, 2000.

Georgakopoulos et al., "An Overview of Workflow Management: from Process Modeling to Workflow Automation Infrastructure", Distributed and Parallel Databases, V. 3, p. 119-153, 1995.

Hilbert; Hilbert, et al., An Approach to Large Scale Collection of Application Usage Data Over the Internet, Software Engineering 1998, Proceedings of the 1998 International Conference, Abstract, Apr. 1998.

Quantitative Monitoring of Software Development by Time-Based and Intercheckpoint Monitoring, Software Engineering Journal, vol. 5, ISS. 1, p. 43-49, Abstract Jan. 1990.

Duggan; 2.40 General—Reviews and Abstracts, SPI Database of Software Technologies, p. 1-5, Feb. 1, 1974.

OS/2EE Database Manager SQLJRA Remote Protocol, IBM Corporation, IBM TDB N10-93, p. 33-36, Jan. 1, 1993.

Code Generation for Database Applications, IBM Corporation, p. 1-3, Mar. 1, 2002.

Hudeponhl et al.; Integrating Metrics and Models for Software Risk Assessment, The Seventh International Symposium on Software Reliability Engineering (ISSRE '96), p. 93, Oct. 30, 1996.

Wohlin et al.; Understanding the Sources of Software Defects: A Filtering Approach, 8TH International Workshop on Program Comprehension (IWPC '00), p. 9, (Abstract), Jun. 10, 2000.

Basili et al.; Understanding and Predicting the Process of Software Maintenance Releases, 18TH International Conference on Software Engineering (ICSE '96), Mar. 25-29; p. 464; (Abstract).

Betwixt: Turning Beans Into XML, Apache Software Foundation, Archived Jun. 20, 2002 at <HTTP://WEB.ARCHIVE.ORG/WEB/20020620000410/HTTP://JAKARTA.APACHE.ORG.COMMONS/BETWIXT/>, p. 1 of 1, Nov. 13, 2005.

Castor: Using Castor XML, Exolab Group, Archived Aug. 27, 2001 at <HTTP://WEB.ARCHIVE.ORG/WEB/20011019155934/HTTP://WWW.CASTOR.ORG/XML-FRAMEWORK.HTML>, Retrieved From the Internet on Nov. 11, 2005.

Campione, et al.; Special Edition Using Java Tutorial, Third Edition: A Short Course on the Basics, Addison Wesley Professional ISBN: 0201-70393-9, 21 pages From Chapter 5, Dec. 28, 2000.

Hamilton; Javabeans, Sun Microsystems, Chapter 8, Aug. 8, 1997.

Reinhart; Liability Management: A New Tool for Financial Consultants, Financial Consultant, vol. 1, No. 3, p. 7-11, Fall/Winter 1996, ISSN 1091-644X, Dialog File 15, Accession No. 01395382.

McConnell; Gauging Software Readiness With Defect Tracking; IEEE; May/Jun. 1997.

Yu, et al.; An Analysis of Several Software Defect Models; IEEE Transactions on Software Engineering, vol. 14., No. 9; Sep. 1988.

Sammet, Jean; Beginning of 4.6 Software Evaluation, Tests, and Measurements and RMF I/O Time Validation [Online]. Aug. 26, 1996; Retrieved on 23:58:07; the Software Patent Institute Database of Software Technologies.

Sanjay, Mohapatra, B. Mohanty, Defect Prevention Through Prediction: A Case Study at INFOSYS, 17th IEEE International Conference of Software Maintenance, 2001.

Sybase Adaptive Server (TM) Enterprise Monitor (TM) Client Library Programmer's Guide, May 2001, Monitor Client Library.

Agostini et al.; A Light Workflow Management System Using Simple Process Models, Cooperation Technologies Laboratory, Disco-University of Milano-Bicocca (Aug. 2000).

Fenton et al; A Critique of Software Defect Prediction Models, vol. 25, No. 5, p. 675-689 (Sep./Oct. 1999).

Georgakopoulos et al; An Overview of Workflow Management: From Process Modeling to Workflow Automation Infrastructure, Kluwer Academic Publishers, Boston, Distributed Parallel Databases, vol. 3, p. 119-153 (1995).

Levendel; Reliability Analysis of Large Software Systems: Defect Data Modeling, vol. 16, No. 2, p. 141-152 (Feb. 1990).

Muehlen, Business Process Automation and Workflow in the Financial Industry, CSK Software AG, Version 3, p. 1-37 (Sep. 10, 2003).

Reinhart, Liability Management: A New Tool for Financial Consultants, Financial Consultant, vol. 1, No. 3, p. 7-11 (Fall/Winter 1996).

* cited by examiner

FIG. 2

| Icon | Name | |
|---|---|---|
|  | Ordinary Activity | ~201 |
|  | Script Activity | ~202 |
|  | COM Activity | ~203 |
|  | Transactional Activity | ~204 |
|  | NET Activity | ~205 |
|  | Web Service Activity | ~206 |
|  | Create New Job Type Activity | ~207 |
|  | State Activity | ~208 |

FIG. 3

| Icon | Name | |
|---|---|---|
|  | Static Useable Resource Only | ~301 |
|  | Dynamic Usable Resource Only | ~302 |
|  | Dynamic and Static Usable Resource | ~303 |
|  | Same as Previous Resource | ~304 |
|  | Automatic | ~305 |
|  | Library Activity | ~306 |

Main Process

Initiation

Environment Set-Up
Part I

Environment Set-Up
Part II
402

UAT Testing
403

Production Environment Set-Up

Go-Live

FIG. 12

Client 1202

General | UAT | Production | Connection | FIX Message | Markets | Notes | Normalizer | Demands | Progress } 1200

1203 {
- COMP ID:
- 2nd COMP ID:
- 4th COMP ID:

Priority: [Tier 1 ▼]
3rd COMP ID:
5th COMP ID:
} 1203

Client Name:
GTW Account Name:

Client Location: [▼]
Business Contact:

1204 {
- Client Address:
- Contact:
- Title:
- Tel:
- E-mail:

Tel:
E-mail:
Rules of Engagement received?: ☑
Rules of Engagement sent?: ☐
} 1204

Alternative Contact:
Helpdesk Number:
Tel:
E-mail:
General Requirements:

JPMorgan Business Contact: [▼]
JPMorgan CC Contact: [▼]
JPM Legal Agreement Status: [Completed ▼]
Date Sent:
Client Status: [NEW ▼]
} 1205

↘ 1206

1207 {
- SS US Live Date:
- IOI US Live Date:
- SS Asia Live Date:
- IOI Asia Live Date:
- SS Euro Live Date:
- IOI Euro Live Date:
- Test Date:

PT US Live Date:
HOE US Live Date:
PT Asia Live Date:
HOE Asia Live Date:
PT Euro Live Date:
HOE Euro Live Date:
Decommission Date:
} 1207

[Client Contacts] [Client Tests] [Additional Client Info] [Submit] [Save] [Cancel]
        1208                                    1201

FIG. 13

Client

[Tab: UAT — 1301]
Tabs: General | UAT | Production | Connection | FIX Message | Markets | Notes | Normalizer | Demands

- COMP ID:
- Client Name:
- Location: Amsterdam
- FIX Version:
- Client OMS:
- OMS Version:
- Fix Engine and Version:

- Engine Location: Amsterdam
- Test Session Start:
- Test Session End:
- Session Initiator:
- Heartbeat Interval: 60
- End of Day / Reset of Sequence Numbers:
- IOI System:

Submit | Save | Cancel

FIG. 14

Client

[Tab: Production — 1401]
Tabs: General | FIX Overview | Production | Connection | FIX Message | Markets | Notes | Normalizer | Demands

- COMP ID:
- Client Name:
- Location: Amsterdam
- FIX Version:
- Client OMS:
- OMS Version:
- Fix Engine and Version:

- Engine Location: Amsterdam
- Production Session Start:
- Production Session End:
- Session Initiator:
- Heartbeat Interval: 60
- End of Day / Reset of Sequence Numbers:

Submit | Save | Cancel

FIG. 15

Client

| General | UAT | Production | Connector | FIX Message | Markets | Notes | Normalizer | Demands | Progress |

1501 (Connector tab)

COMP ID:
Client Name:
Location:
Network Connection:
FIX Connection: 1503

Prod CompID:
Prod Port:
Prod Source IP Address:
JPM Prod IP Address:
JPM Prod TargetCompID:
Other JPM Prod TargetCompID if not listed:
Failover Prod IP Address:
Failover Prod Port:

FCR Request No.:
FCR Requested:
Encryption supported: ~1505
Other Network connection if not listed:
Further Details:

UAT CompID:
UAT Port: ~1504
UAT Source IP Address:
JPM UAT IP Address: }1502
JPM UAT TargetCompID:
Other JPM UAT TargetCompID if not listed:

1504
1502

[Generate FCR] [Submit] [Save] [Cancel]

FIG. 16

Client

Tabs: General | UAT | Production | Connection | FIX Message ~1601 | Markets | Notes | Normalizer | Demands

| | | | |
|---|---|---|---|
| COMP ID: [ ] | Client Name: [ ] | | Location: [Amsterdam] |

Session Layer: ~1602
- ☑ Logon
- ☑ Heartbeat
- ☑ Test Request
- ☑ Resend Request
- ☑ Reject
- ☑ Sequence Reset
- ☑ Logout

Session Exceptions: ~1603 [ ]

Application Messages:
- ☑ New Order Single
- ☑ Order Cancel Request
- ☑ Order Cancel/Replace Request
- ☑ Execution Reports
- ☐ IOI
- ☐ Order Cancel Reject
- ☐ Don't Know Trade
- ☐ New Order List
- ☐ Allocations

Application Exceptions: ~1603 [ ]
Custom FIX Tags: [ ]
Is Tag 1, account sent?: ☐ Yes  ☑ No    If yes, specify if this is the client internal code or any other code: [ ]
Support of Cancel Scenario: [ ]
Support of Cancel/Replace Scenario: [ ]

Order Status: 1604
- ☐ New
- ☐ Partially Filled
- ☐ Filled
- ☐ Done for Day
- ☐ Cancelled
- ☐ Pending Cancel/Replace
- ☐ Rejected
- ☑ Pending New
- ☐ Stopped
- ☐ Calculated
- ☐ Expired

SecurityID: [ISIN ▾]
ExDestination Supported: ☐ Yes ☑ No    ExecInst Supported: ☐ Yes ☑ No
Symbol: ☑ Yes ☐ No    Support for NOEs: ☐ Yes ☑ No
Other, please specify: [ ]
Example New Single Order Message: [ ]

Side: ☐ 1- Buy   ☑ 2- Sell   ☐ 5- Sell Short   ☐ 6- Sell Short Exempt

Order Types: ~1605
- ☐ Market
- ☑ Limit
- ☐ Stop
- ☐ Market on Close
- ☐ Limit Close
- ☐ Stop Limit

Currency: ~1606
- ☐ USD
- ☐ GBP
- ☐ EURO
- ☐ YEN
- ☐ HKD

When sending orders for the London Market, what currency is used? ☐ GBP ☐ GBX ☐ Pounds ☐ Pence

[Submit] [Save] [Cancel]

FIG. 17

Client

General | UAT | Production | Connection | FIX Message | Markets 1701 | Notes 1703 | Normalizer | Demands COMP ID: [ ]   Client Name: [ ]   Location: [Amsterdam]

Trading Regions:   ☐ EMEA    ☐ U.S
1702              ☐ Latin   ☐ Japan
                  ☐ Hong Kong ☐ Australia Other Information: [ ]

[Submit] [Save] [Cancel]

FIG. 18

Client

General | FIX Overview | Production | Connection | FIX Message | Markets | Notes | Normalizer 1801 | Demands COMP ID: [ ]   Client Name: [ ]   Location: [Amsterdam]

| Name | Tag | Action |
|------|-----|--------|

1802

[View Normalizer]

FIG. 21

Client

General | FIX Overview | Production | Connection | FIX Message | Markets | Notes | Normalizer | Demands | Progress | Activity  ~2101

Activity Name: Setup Client in Production GTW ~2102

COMP ID:
Client Name:
Location:

[Complete Activity] [Cancel Activity]
2103

FIG. 22

Client Tests

Comp ID:
Client Name:
Location:
Overall Status: [Not Run ▼] [click here to update overall status]

| TestID | Status | Run DateTime | Attempts |
|--------|--------|--------------|----------|
| 1.1 | Not Run | | 0 |
| 1.2 | Not Run | | 0 |
| 1.3 | Not Run | | 0 |
| 1.4 | Not Run | | 0 |
| 1.5 | Not Run | | 0 |
| 1.6 | Not Run | | 0 |
| 1.7 | Not Run | | 0 |
| 1.8 | Not Run | | 0 |
| 1.9 | Not Run | | 0 |

Client Demand

2501 { Demand Title:
Demand ID:
Category:
Description:
Region:
Priority:
2503 { Release Date:
Date Raised:

Manual Workaround:
2505

Attachments:
2507

2502 { System Impact:
Business Impact:
Required Date:
Status: ~2504
Requested by/Sponsor:
Dependencies:
Demand Entered by:

Notes:

FileName — Add File / Remove File

Clients Affected:
2506
If all existing and future clients are to be affected by this demand then click here Clients Not Affected — CompID | Name
Clients Affected — CompID | Name Add  Cancel
2508

FIG. 27

Normalizer

- 2701
- 2702 Delete Normalizer
- 2703 Edit Normalizer
- 2704 Create Normalizer

FIG. 28

Client Normalizer

- 2801 Field Name:
- 2802 Tag:
- 2803 Status:
- 2804 Actions:
- 2805 Clients Affected:
- 2806 Add / Cancel Work queue

USER CONNECTIVITY PROCESS MANAGEMENT SYSTEM

CROSS-REFERENCE TO RELATED APPLICATION

This application claims the benefit of U.S. Provisional Application No. 60/551,436, filed Mar. 9, 2004, the entire disclosure of which is hereby incorporated herein by reference.

FIELD OF THE INVENTION

This invention relates to a user connectivity process management system. In particular, this invention relates to a system for managing the process of providing users with direct market access for the trading of financial instruments.

BACKGROUND OF THE INVENTION

Today's technology is capable of providing direct access to markets, allowing users to trade financial instruments on their own from almost any location. Access to this technology is highly demanded, and, therefore, it is important to quickly and efficiently provide such access to users. However, providing users with access to systems that provide direct market access is very complicated, requiring numerable steps. Conventionally, these steps have been manually managed and performed, taking up to six or more months to complete the task of providing direct market access to users. With the high state of demand for direct market access, such delays of six or more months are unacceptable.

SUMMARY OF THE INVENTION

These problems are solved and a technical advance is achieved in the art by a system according to the present invention that manages the process of providing a client access to a secured service, referred to herein as the "client connectivity" process or the "CC" process. In the exemplary embodiment, the secured service is a computer system that allows the client to trade financial instruments. The process management system according to the present invention includes managing execution of tasks that can be automatically executed; delegating tasks that require manual execution; communicating with entities outside of the process management system; and handling "demands," or unexpected problems that arise in the middle of the client connectivity process.

To elaborate, the client connectivity process includes a series of tasks, both automatic and manual. The automatic tasks are executed by either the process management system or other computers automatically. The manual tasks are executed by individuals who interface with the process management system via a user-interface disclosed herein. The process management system advances through the client connectivity process by instructing the pertinent computers to automatically execute the automatic tasks and sending messages to the individuals responsible for executing the manual tasks. The individuals responsible for executing the manual tasks access the user-interface via a computer and view such messages in their "activity" list. When the individual completes a manual task, the process management system is notified that the manual task is complete also via the interface. Once a manual task is complete, the process management system advances to the next task in the client connectivity process.

As the client connectivity process depends upon entities external to the process management system, such as the client and third party network providers, the system also interfaces with these external entities. For instance, the system sends messages to the client regarding connection information required to connect to the secured service, and sends requests to third party networks to initiate client connectivity through such networks, if necessary.

Further, the process management system according to the present invention handles "demands," or unexpected problems that arise in the middle of the client connectivity process. In particular, if a problem occurs during the process, an individual enters such problem, or demand, into the system via the user-interface. The process management system takes this demand and inserts additional required tasks into the client connectivity process flow. These additional tasks are then delegated to the computers and or individuals for execution as necessary.

BRIEF DESCRIPTION OF THE DRAWINGS

A more complete understanding of this invention may be obtained from a consideration of this specification taken in conjunction with the drawings, in which:

FIGS. 2 and 3 illustrate icons used to describe tasks in the process flows according to the exemplary embodiment of the invention;

FIG. 12 illustrates a portion of a client page of the user-interface relating to a "General" tab;

FIG. 13 illustrates a portion of a client page of the user-interface relating to a "UAT" tab;

FIG. 14 illustrates a portion of a client page of the user-interface relating to a "Production" tab;

FIG. 15 illustrates a portion of a client page of the user-interface relating to a "Connection" tab;

FIG. 16 illustrates a portion of a client page of the user-interface relating to a "FIX Message" tab;

FIG. 17 illustrates a portion of a client page of the user-interface relating to a "Markets" tab;

FIG. 18 illustrates a portion of a client page of the user-interface relating to a "Normalizer" tab;

FIG. 21 illustrates a portion of a client page of the user-interface relating to a "Activity" tab;

FIG. 22 illustrates a "Client Tests" page of the user-interface, which is accessed from the page of FIG. 12;

FIG. 23 illustrates a "Test Details" page of the user-interface, which is accessed from the page of FIG. 22;

FIG. 24 illustrates a "Demands" page of the user-interface, which is accessed from the page of FIG. 11;

FIG. 25 illustrates a "Creating a Demand" page of the user-interface, which is accessed from the page of FIG. 24;

FIG. 27 illustrates a "Normalizer" page of the user-interface, which is accessed from the page of FIG. 11;

FIG. 28 illustrates a "Creating a Normalizer" page of the user-interface, which is accessed from the page of FIG. 27;

DETAILED DESCRIPTION OF THE EXEMPLARY EMBODIMENT OF THE INVENTION

I. Exemplary Hardware Arrangement

Figure 1:
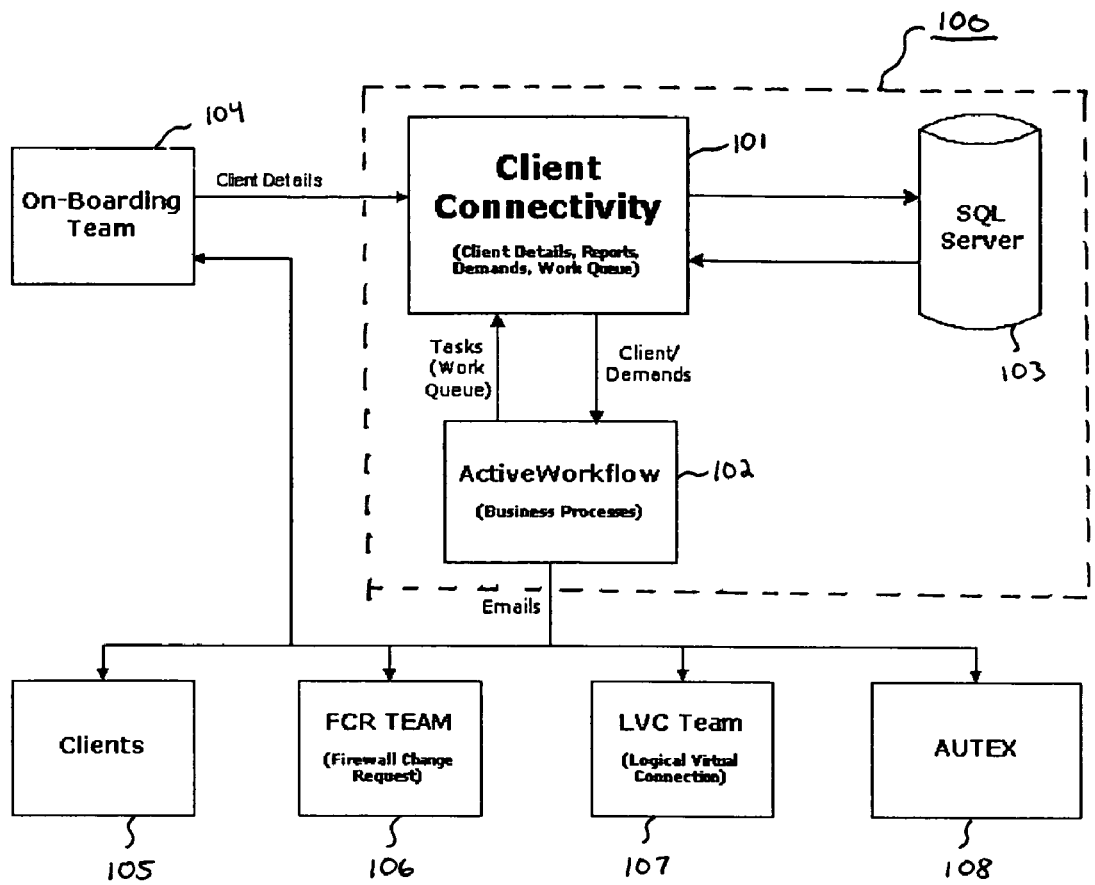
FIG. 1 illustrates an exemplary computer hardware arrangement according to an aspect of the present invention.

The exemplary embodiment of the process management system 100 according to the present invention will now be described in greater detail with reference to FIG. 1. In this figure, an exemplary hardware arrangement of the process management system is shown. The process management system 100 includes the "client connectivity" system 101, the "active workflow" system 102, and the database 103. The client connectivity system 101 includes one or more computers that gather information pertaining to the client connectivity process, such as client information, demands, manual task work queues, connection information, etc. . . . , and store such information in the database 103. The active workflow system 102 includes one or more computers that manage advancement through the client connectivity process. Accordingly, the active workflow system 102 communicates with the client connectivity system 101 to exchange demand information and manual task queues. As demands arise, the client connectivity system 101 passes them on to the active workflow system 102, and the workflow system 102 adjusts the task flow in the client connectivity process accordingly. It should be noted that although the active workflow system 102 and the client connectivity system 101 are shown separate, they may reside on a single computer.

The active workflow 102 also manages communication with entities external to the process management system. Such entities include one or more computers 104 belonging to what is referred to herein as the "on-boarding team." The "on-boarding team" represents one or more individuals responsible for executing manual tasks in the client connectivity process. The computers 104 of the on-boarding team operate the user-interface disclosed herein. As manual tasks arise in the client connectivity process flow, the active workflow system 102 notifies a computer belonging to one or more individuals on the on-boarding team 104 responsible for executing such tasks. The notified individuals view the task via the user-interface, execute the task, and then notify the active workflow system 102 of its completion via the user-interface. Once complete, the workflow system 102 proceeds to the next task in the process.

Other external entities include clients 105 that desire to obtain access to the secured service (not shown). The workflow 102 communicates with the client 105, notifying the client of demands, status updates, and connection information. External entities also include individuals 106, referred to herein as the "Firewall Change Request team," or "FCR team," responsible for updating the secured service's firewall to accommodate the client 105. The active workflow system 102 will send a message to the FCR team when the manual task of updating the firewall is ready for execution.

Other external entities include individuals 107, referred to herein as the "Logical Virtual Connection team," or "LVC team," responsible for establishing a Logical Virtual Connection required by some third party networks, if necessary. As with the FCR team, the workflow system 102 will send a message to the LVC team if and when establishment of an LVC is required. Additionally, external entities include Autex 108, which is an exemplary third party network provider that some clients 105 may use. The worfkflow system 102 will send requests to Autex 108, or other third party network providers, if any, when establishment of a connection between the client 105, the third party network, and the secured service is required.

II. Exemplary Client Connectivity Process Flow

Now, the client connectivity process flow ("CC process") managed by the active workflow system 102 will be described in more detail with reference to FIGS. 2-10. FIGS. 2 and 3 illustrate the symbols used to describe particular tasks in the CC process. These symbols appear next to the tasks described in FIGS. 4-10 and 26. Referring to FIG. 2, "Ordinary Activity" icon 201 denotes a default task type that is executed manually. Tasks of this default type are normally carried out by specified useable resources. "Script Activity" 202 denotes a task that executes a series of instructions in a given language consecutively. Specified usable resources execute these script tasks either automatically or manually. "COM Activity" icon 203 denotes a task that calls a COM object, known in the art, and can be executed automatically or manually by specified resources.

"Transactional Activity" 204 denotes a task that calls a combination of one or more COM objects and is always executed automatically. ".NET Activity" icon 205 denotes a task that calls a .NET object. Tasks of this type can be executed automatically or manually by specified resources. "Web Service Activity" 206 denotes a web service task that calls a specific URL and can be executed either automatically or manually by specified usable resources. "Create New Job Type Activity" 207 denotes a task that allows the creation of and insertion of a new task into the CC process. This task type incorporates flexibility into the CC process by allowing unanticipated issues, such as demands, to be addressed on the fly. Create New Job tasks 207 can be executed automatically or manually by specified resources. "State Activity Icon" 208 denotes an "Ordinary" type activity 201 that has no specified resources.

Referring to FIG. 3, "Static Useable Resource Only" icon 301 denotes a task that is executed manually by a static resource. A static resource is defined at design time and cannot be changed at run-time. "Dynamic Useable Resource Only" icon 302 denotes a task that is executed manually by dynamically defined resources that can be changed at run-time. "Dynamic and Static Useable Resource" icon 303 denotes a task that is executed manually by static and dynamic resources. "Same as Previous Resource" icon 304 denotes a task that is executed manually by resources that have carried out a selected previous task. Icons 301-304 can appear in conjunction with any task type, with the exception of "Transactional" activities 204.

"Automatic" icon 305 denotes a task that is executed automatically by the system. This icon may appear in conjunction with "Script" 202, "COM" 203, and "Create New Job" 207 type tasks, and always appears in conjunction with a "Transactional" activity 204. Finally, "Library Activity" icon 306 denotes a shared task. Library activities can be used across different sub-processes of the CC process. This icon can appear in conjunction with any activity type.

The workflow system 102 instructs automatic execution of the automatic tasks described by the icons in FIGS. 2 and 3. When manual tasks arise in the CC process, the workflow system 102 notifies the appropriate individual(s) 104, 106, and/or 107 via the user interface to execute such tasks. The workflow system 102 is notified of completion of the manual tasks via the user interface and then advances the CC process to the next task.

Figure 4:
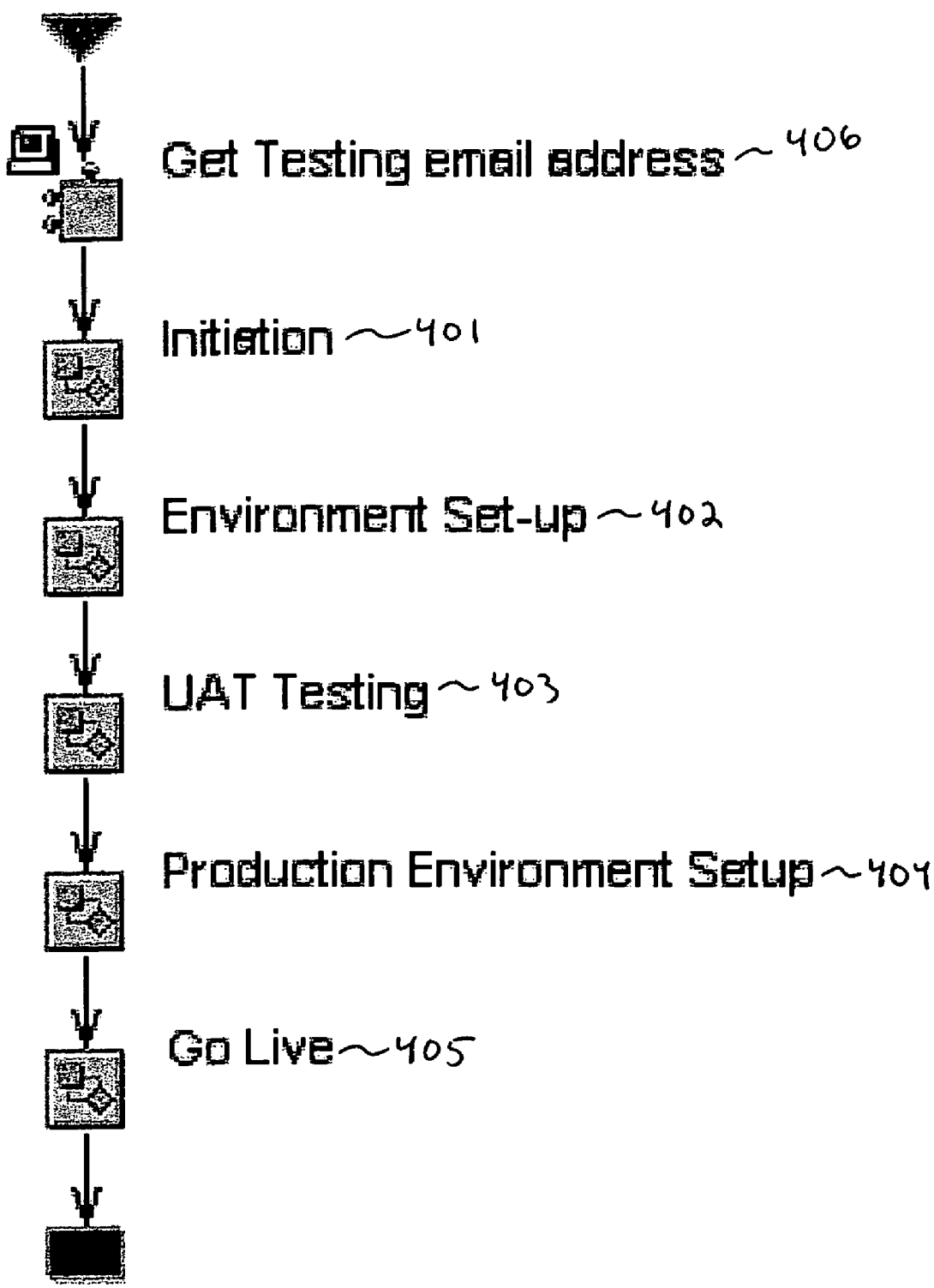
FIG. 4 illustrates a high level view of the client connect process flow according to the exemplary embodiment.

Having introduced the meaning of the icons shown in the figures, the underlying sub-processes of the CC process will now be described with reference to the process flows shown in FIGS. 4-10. FIG. 4 represents a high level view of the entire CC process according to the exemplary embodiment of the present invention. The process flow of FIG. 4 is referred to as the "main process." The main process includes five subprocesses: Initiation 401, described with FIG. 5; Environment Set-Up 402, described with FIGS. 6 and 7; User Acceptance Testing ("UAT") Testing 403, described with FIG. 8; Production Environment Set-Up 404, described with FIG. 9; and Go Live 405, described with FIG. 10. Prior to beginning the subprocesses, email addresses associated with individuals involved with the CC process may be obtained at 406.

The first subprocess of FIG. 4 is initiation 401, which will now be described in detail with reference to FIG. 5. The initiation process 401 includes tasks focusing on obtaining information necessary to begin the CC process, such as general client information 501, protocol information, such as information required to comply with the FIX protocol 502 and 504, and connection information about the client 503. The FIX protocol is the Financial Information eXchange (FIX) protocol, which is a messaging standard developed specifically for the real-time electronic exchange of securities transactions as is known in the art.

In the exemplary embodiment, the tasks 501-504 are manually performed by individuals on the on-boarding team 104 using the user-interface described below. The active workflow system 102 delegates manual tasks, such as these, by sending notifications to the responsible individuals on the on-boarding team 104, via the user-interface. The workflow system 102 waits for an indication that the manual tasks are complete before proceeding to the next task. The information input at 501, 502, 503, and 504 is described with reference to FIGS. 12, 13, 15, and 16, respectively.

As will be shown, each of the subprocesses of FIG. 4 include a subprocess of resolving outstanding demands. In the initiation process 401, this subprocess occurs at 505. When a problem arises during the CC process, an individual on the on-boarding team 104 raises a demand via the user interface described below with reference to FIGS. 24-26. In the subprocess at 505, tasks required to resolve the demand are delegated to the appropriate individuals on the on-boarding team 104 for execution. Once the tasks are complete and the demand resolved, the CC process exits the demand subprocess at 505.

The initiation process 401 also includes status update tasks and some other preliminary tasks. In particular, the initiation process 401 includes updating a status of the CC process to indicate that the initiation process 401 is being executed at 506. Also, an overall percentage complete of the CC process is updated periodically when certain tasks are completed, as shown at 509, for example. Further, the client is added to a mapping table at 507 stored in the database 103 that includes a list of all clients involved in the CC process. Additionally, the initiation process 401 includes adding a set of tests at 508 to the database 103 that must be performed to ensure proper connectivity for the client. Client tests are described in more detail with respect to FIGS. 22 and 23.

Figure 6:
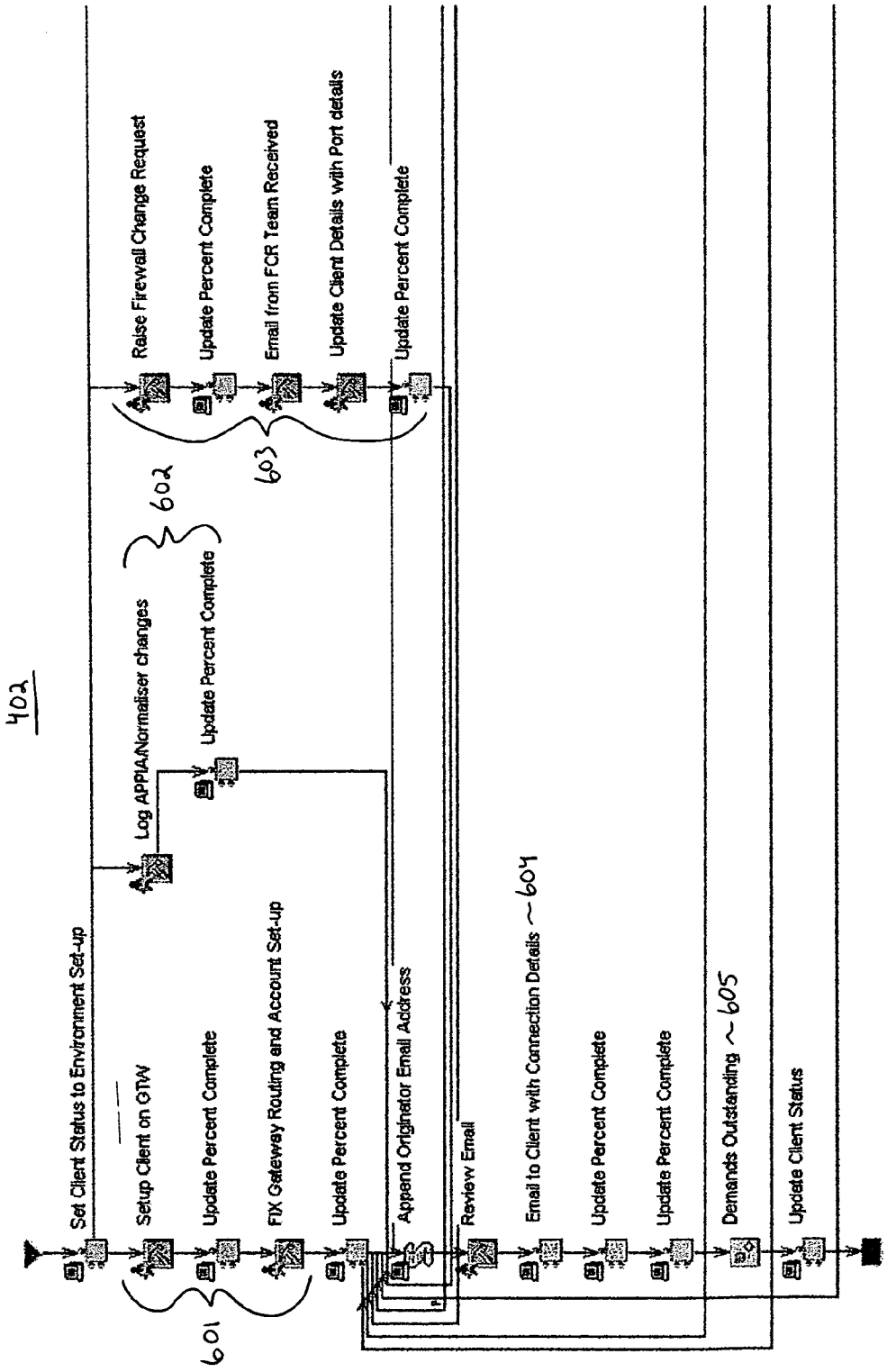
FIGS. 6 and 7 illustrate the environment set-up process flow shown in FIG. 4.
Figure 7:
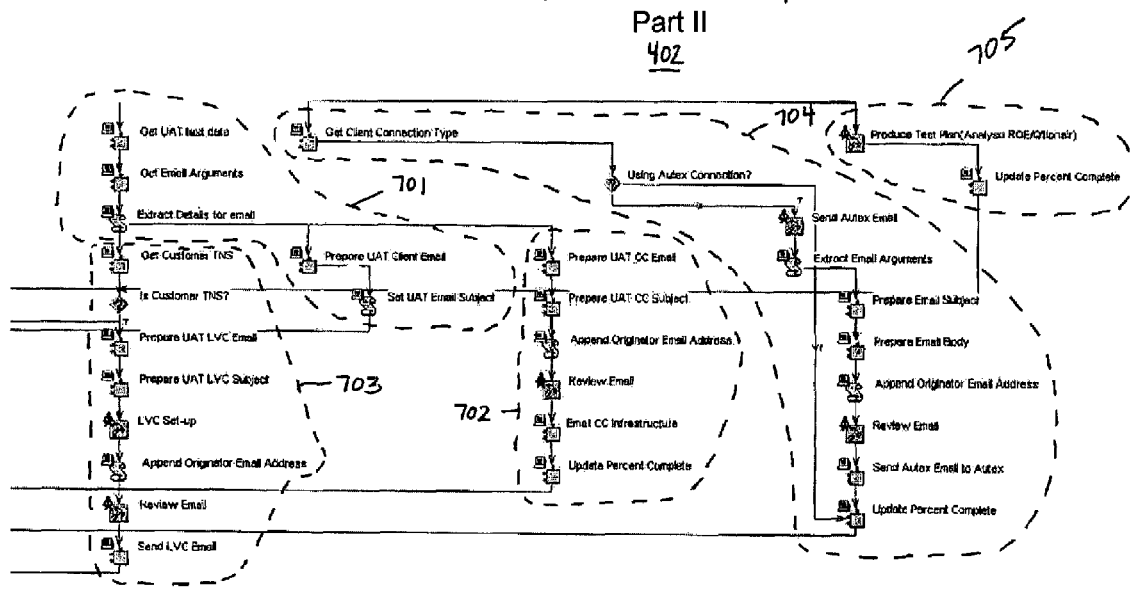

After completing the initiation process 401, the environment set-up process 402 begins, which is shown with FIGS. 6 and 7. The environment set-up process 402 prepares the appropriate connection parameters, accounts, and third party networks for connection between the secured service and the client. The preparations made in the environment set-up process 402 are a prelude for testing the connection to the client, which is described below with reference to User Acceptance Testing and FIG. 8.

The tasks involved in the environment set-up process 402 include setting up the client for access to the Global Trading Workstation ("GTW"), which is a platform by which the client will trade financial instruments, and setting up FIX gateway routing and associated account information at 601. The tasks at 602 represent recording additional parameters required for the client to seamlessly communicate via the FIX protocol, such as normalizers discussed below with reference to FIGS. 27 and 28. The tasks at 603 pertain to updating the secured service's firewall to accommodate the client. Such tasks include sending a notification to the FCR team 106 requesting that the firewall be adjusted, receiving a notification from the FCR team 106 that this manual task has been completed, and recording the updated port information associated with the firewall change.

Turning now to FIG. 7, which shows the second half of FIG. 6, the tasks at 701 and 702 pertain to acquiring a test date at which the client will be able to perform its User Acceptance Testing to test its connection to the secured service. Once a test date is acquired, such information is sent to the client 105 via a message from the active workflow system 102, as shown at 701. Also, members of the on-boarding team 104 are notified of the test date and associated information via a message from the active workflow system 102, as shown at 702. In the exemplary embodiment, these members of the on-boarding team 104 are referred to as the "CC Infrastructure" team.

The tasks at 703 determine whether the client uses TNS, which is an exemplary third party network that requires use of a "Logical Virtual Connection." If the client 105 uses TNS, a message is sent to the LVC team 107 by the active workflow system 102 notifying them of their responsibility to complete the manual task of setting up an LVC.

The tasks at 704 determine whether the client uses Autex, another exemplary third party network. If so, a message is prepared and sent to the third party network provider, in this example, Autex 108, by the workflow system 102. The message requests the third party network provider to adjust their system to allow connectivity between the client 105 and the secured service. The tasks at 705 pertain to preparation of a test plan, which is a manual task, for use in the user acceptance testing ("UAT") process.

Returning to FIG. 6, after the above-mentioned tasks have completed, the client 105 is sent a message at 604 containing the connection information required for the client to connect to secured service for UAT. At 605, outstanding demands are resolved prior to proceeding to such testing.

Figure 8:
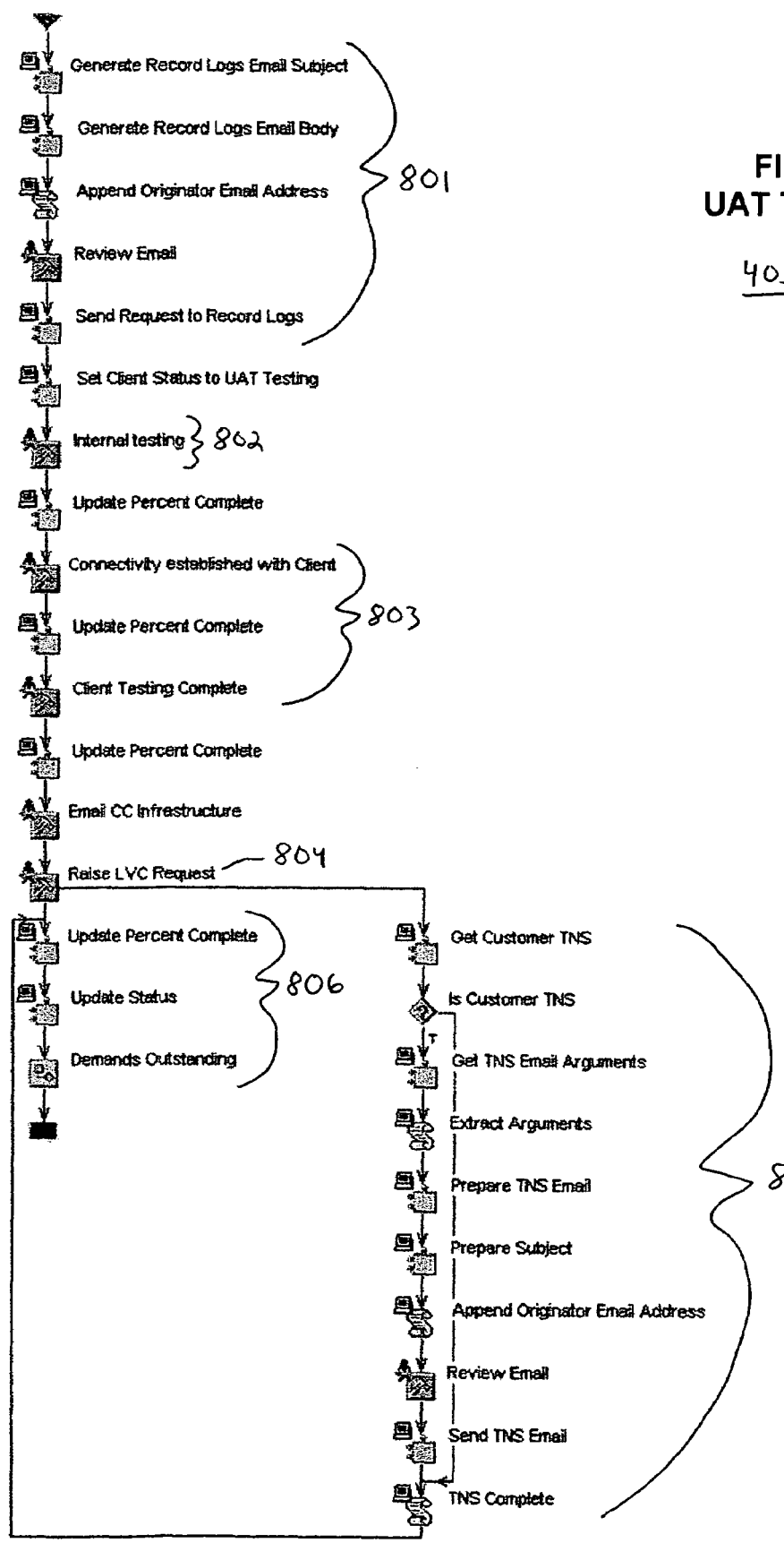
FIG. 8 illustrates the user acceptance testing process flow shown in FIG. 4.

Testing occurs during execution of the UAT testing process 403 shown in detail in FIG. 8. The UAT testing process 403 includes preparation of logging functionality 801 to log errors in the testing process and performing internal testing 802 of client tests identified at 508 in FIG. 5 and according to the test plan of 705 in FIG. 7. UAT also includes establishing a connection with the client 105 at 803 so that the client can perform its user acceptance testing to ensure that the connection works properly. Once testing is complete, if the client 105 uses TNS, the LVC is established to such network at 804. The third party provider of the TNS network is notified of such connection at 805. To complete the UAT process, outstanding demands are resolved and the status of the process is updated at 806.

Figure 9:
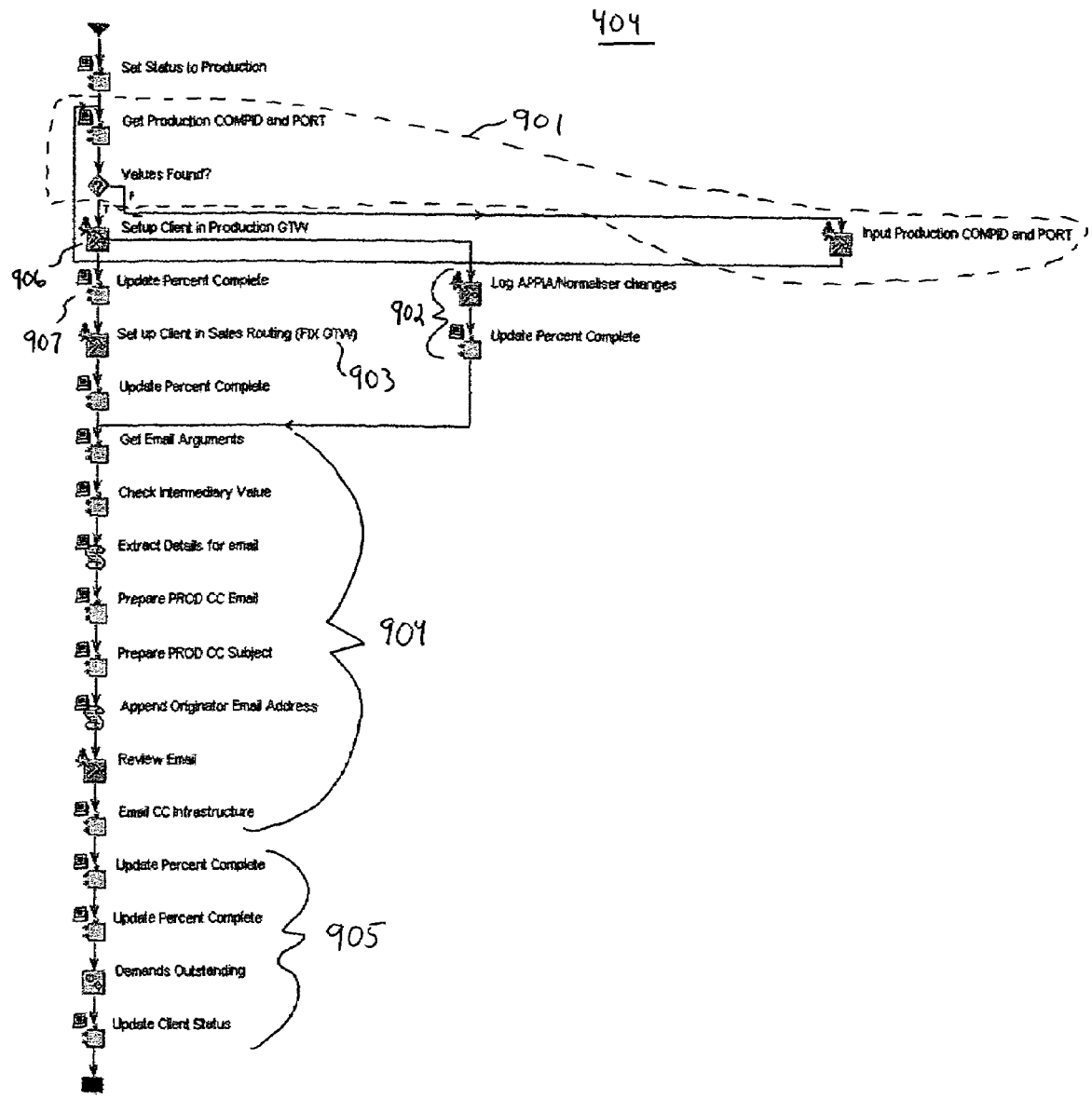
FIG. 9 illustrates the production environment set-up process flow shown in FIG. 4.

With UAT testing 403 complete, the CC process advances to production environment set-up 404, shown in detail in FIG. 9. The environment set-up process involves compiling final port information 901 and protocol interface information 902, and preparing the applications necessary to allow the client 105 access to the secured service 903. In the exemplary embodiment, such applications include the global trading workstation which uses the FIX protocol and allows the client 105 direct market access to trading financial instruments. The environment set-up process 404 also includes tasks that notify appropriate individuals at 904 on the on-boarding team 104 of the client's impending live connection to the secured service. In the exemplary embodiment, the individuals that are notified are referred to as the "production client connectivity" team, or "PROD CC," and the "client connectivity infrastructure" team, or "CC Infrastructure." To complete the production environment set-up process 403, process statuses are updated and outstanding demands resolved at 905.

Figure 10:
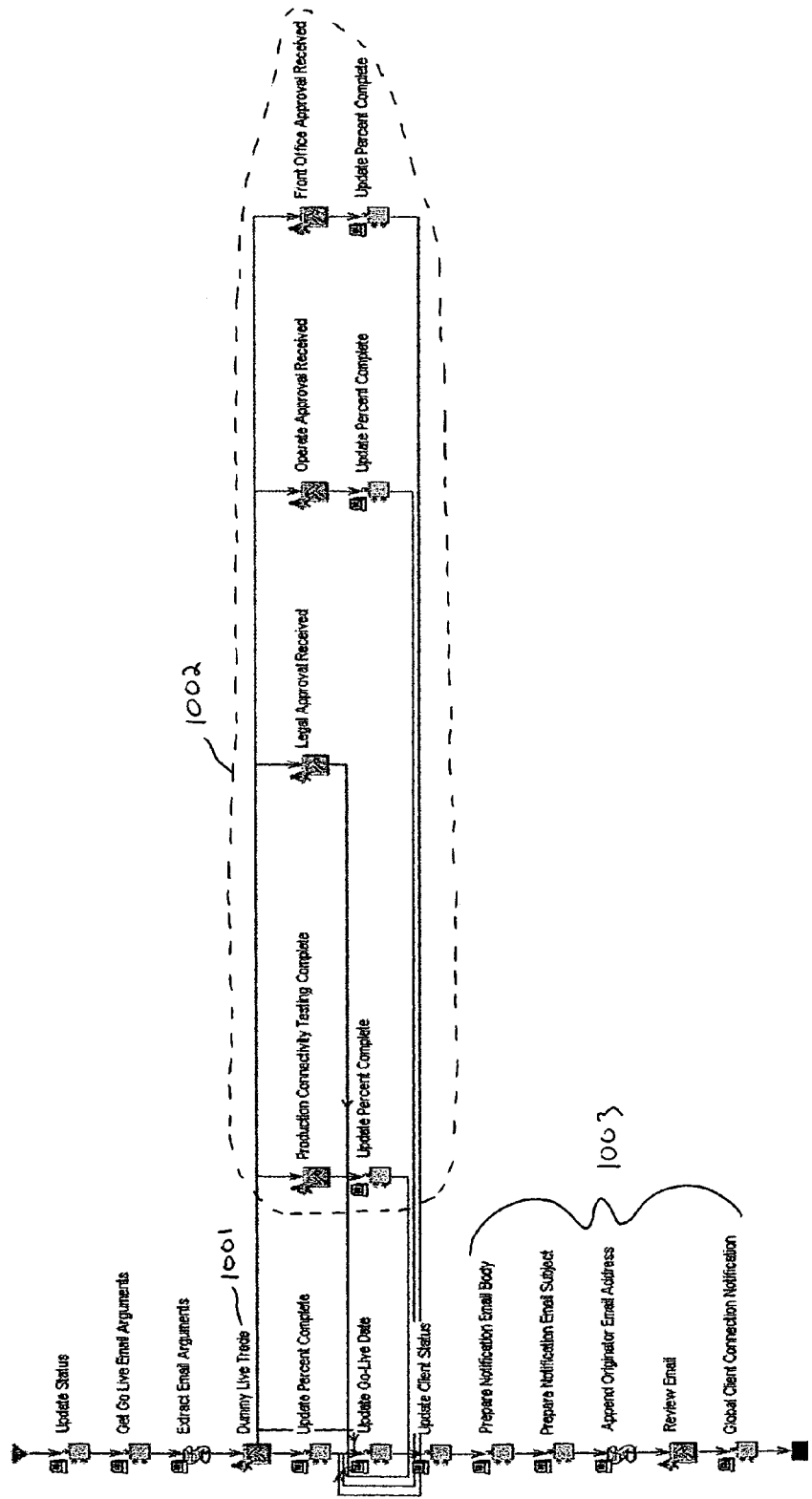
FIG. 10 illustrates the go-live process flow shown in FIG. 4.

With the production environment ready, the "Go-Live" process 405 is executed, as shown in detail with FIG. 10. This process includes tasks pertaining to testing the live connection to the client, such as executing a dummy live trade 1001, and receiving approval from the appropriate individuals to allow the client 105 access to the secured service. Such approval is shown at 1002, and includes approval from legal personnel, front office personnel, and operators. Once approval is received, a message is sent to all involved parties, including the client 105, indicating that the client now has access to the secured service at 1003, thereby completing the CC process.

III. Exemplary User Interface

The exemplary user interface for interacting with the process management system 100 will now be described. The exemplary user interface is operated by computers associated with individuals on the on-boarding team 104, the FCR team 106, and the LVC team 107. However, this user interface may also be operated by the client 105, Autex 108, and any other individual or entity interested in the CC process.

Access to the process management system 100 via the interface is controlled using user names, passwords, and a series of user types having varying levels of access rights to the process management system 100. For instance, a particular user may be associated with an "admin" user type and have complete read and write access to the process management system 100. The client 105, on the other hand, may be associated with a user type that has read-only access. Members of the on-boarding team 104 may be associated with an intermediate user type having limited write access and full read access.

Figure 11:
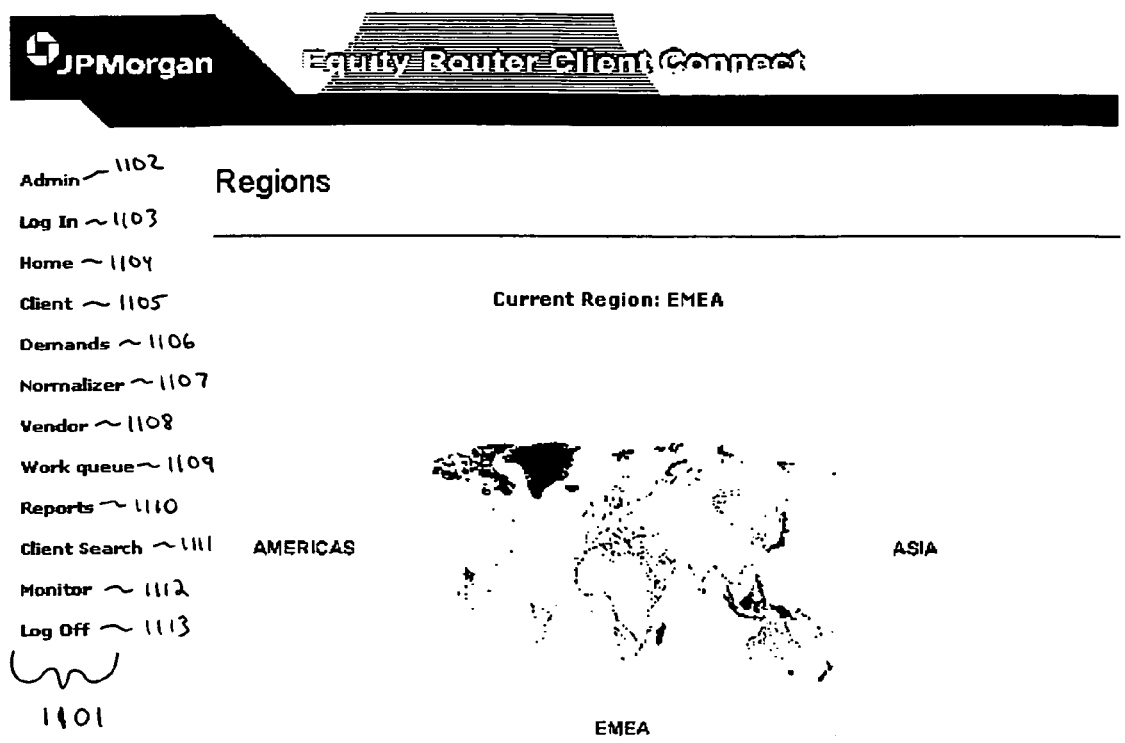
FIG. 11 illustrates a "Regions" or "Home" page of a user-interface according to the exemplary embodiment of the present invention.
Figure 29:
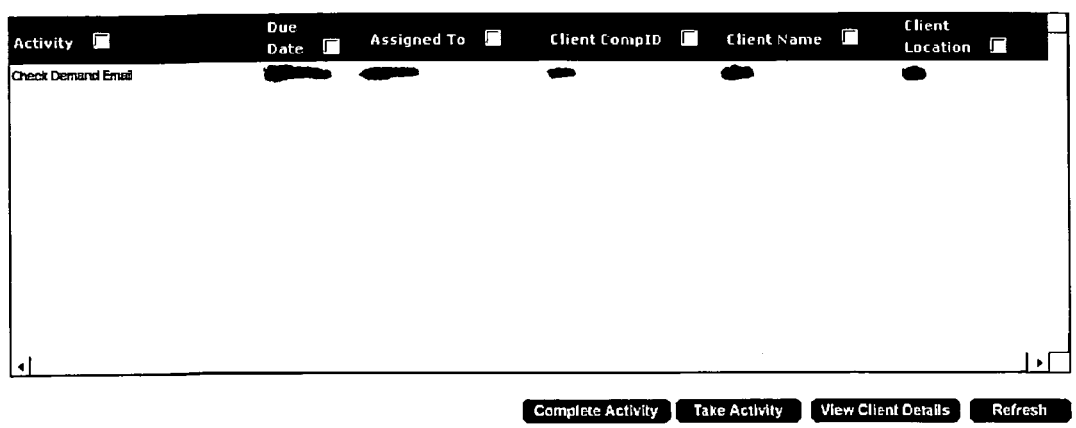
FIG. 29 illustrates a "Work Queue" page of the user-interface, which is accessed from the page of FIG. 11.
Figure 30:
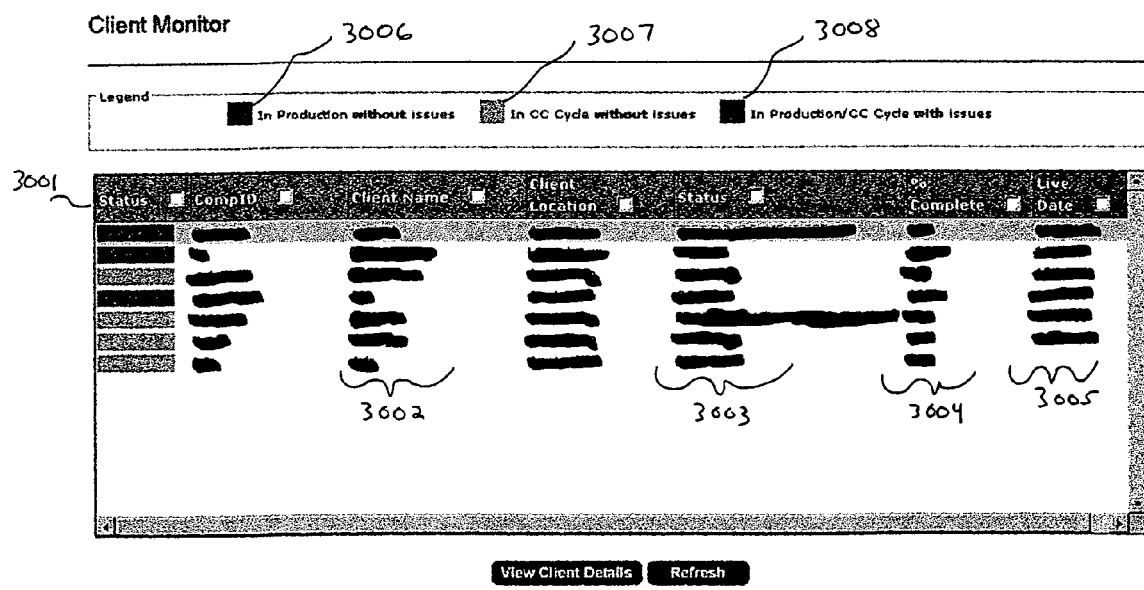
FIG. 30 illustrates a "Client Monitor" page of the user-interface, which is accessed from the page of FIG. 11.

Once a user enters a valid user name and password, a home page shown at FIG. 11 is displayed. The home page includes a navigation bar 1101 having links that, when selected, take the user to another page and/or perform an action. The "Admin" link 1102 displays a "User Configuration" page where an admin can add users to or remove users from the user-interface, or modify the user types associated with users. The "Log In" link 1103 displays a "Login" page where the user, or another user, may log in. The "Home" link 1206 brings the user to the home page, which is currently being described with reference to FIG. 11. The "Client" link 1105 displays the "Client" page illustrated at FIGS. 12-23. The "Demands" link 1106 brings the user to a "Demands" page illustrated at FIGS. 24-25. The "Normalizer" link 1107 displays a "Normalizer" page illustrated at FIGS. 27-28. The "Vendor" link 1108 displays a "Vendor" page where the user can add, remove, or modify vendor information. The "Work queue" link 1109 brings the user to a "Work queue" page illustrated at FIG. 29, and the "Reports" link 1110 displays a "Reports" page where the user can run reports displaying information pertaining to the CC process. The "Client Search" link 1111 displays a "Client Search" page where the user can search for particular clients. The "Monitor" link 1112 displays a "Client Monitor" page illustrated at FIG. 30. And, the "Log Off" link 1113 logs the user off of the user-interface.

The "Client" page, accessed by link 1105, will now be described with reference to FIGS. 12-23. The "Client" page is used to set up clients or display information relating to clients. The Client page includes several subpages which can be accessed by clicking on tabs 1200 at the top of the Client page (FIG. 12). To create a new client, the user inputs the information required on each of these subpages and then click on a "Submit" button (1201, for example). After selecting the submit button 1201, the client information is sent to the project management system 100 via the client connectivity system 101. If all of the necessary information has been entered, the new client is created and a new client connect process is initiated for that client (FIG. 4).

Each of the tabs 1200 of the Client page will now be described by first referring to FIG. 12. In FIG. 12, the "General" tab 1202 is currently selected. The "General" tab 1202 displays a form containing general client information, such as company identifiers for the client 1203, client contact information 1204, other contact information 1205, client status information 1206, and key event dates pertaining to the CC process 1207. The task of inputting this information is shown at 501 in FIG. 5.

Turning now to FIG. 13, the UAT Tab 1301 on the client page will be described. The UAT tab 1301 provides information relating to the FIX details associated with the client at issue for use in the User Acceptance Testing environment. These details describe parameters of the client's system to facilitate communication using the FIX protocol. The task of inputting this information is shown at 502 in FIG. 5.

The "Production" tab 1401 will now be described with reference to FIG. 14. This tab provides the same information as the UAT Tab 1301, except that the information in the "Production" tab 1501 relates to the production environment.

FIG. 15 illustrates the "Connection" tab 1501. The connection tab 1501 provides information relating to the client's communication connection, such as IP addresses 1502, network connection types 1503, ports 1504, and encryption types 1505. This information is input at 503 in FIG. 5.

FIG. 16 illustrates the "FIX Message" tab 1601 that provides information relating to the particular parameters associated with the client's FIX message usage when conducting trades, such as session layer information 1602, session and application exceptions 1603, order status 1604, order types 1605, and currency 1606.

FIG. 17 illustrates the "Markets" tab 1701, which allows the user to select, among other things, trading regions 1702 where the client will be trading financial instruments via the secured service. Exemplary regions include EMEA (i.e., Europe, the Middle East, and Asia), the United States, Latin America, Japan, Hong Kong, and Australia. The notes tab 1703 allows the user to enter any miscellaneous information regarding the CC process. Also from the notes tab 1703, the user can set up reminders that prompt the workflow system 102 to send messages to particular users of the user interface at particular times.

FIG. 18 illustrates the "Normalizer" tab 1801, that when selected, displays a form pertaining to message translations. Because the client's system may not communicate in the same manner that the secured service communicates, messages from the client system to the secured service, and vice versa, may need to have translation functions applied to them. The translation functions, or normalizers, act as an interface between the client system 105 and the secured service allowing them to communicate with each other in a format understandable by both sides. The form shown in FIG. 18 allows the user to view existing normalizers, which are listed in the window 1802. Entry of new normalizers is discussed below with reference to FIGS. 27 and 28.

Figure 19:
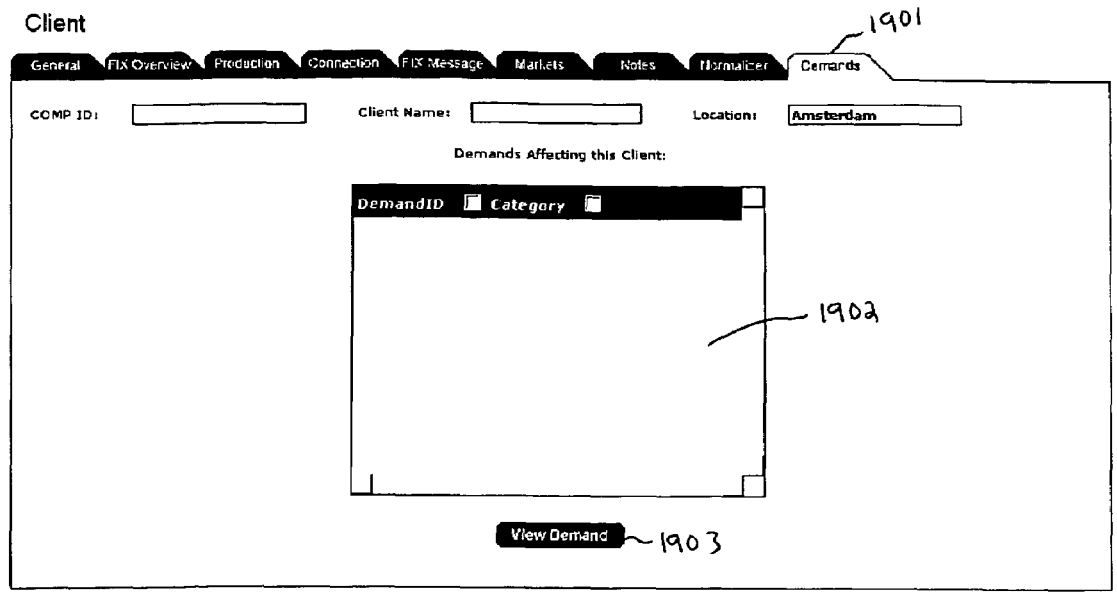
FIG. 19 illustrates a portion of a client page of the user-interface relating to a "Demands" tab.

FIG. 19 illustrates the "Demands" tab 1901 that, when selected, displays a form allowing the user to view a list of outstanding demands. Existing demands are displayed in row format in the window 1902. The user can view more details of a particular demand by selecting an existing demand in the window and then selecting the "View Demand" button 1903. Entry of new demands is discussed in more detail with reference to FIGS. 24-26.

Figure 20:
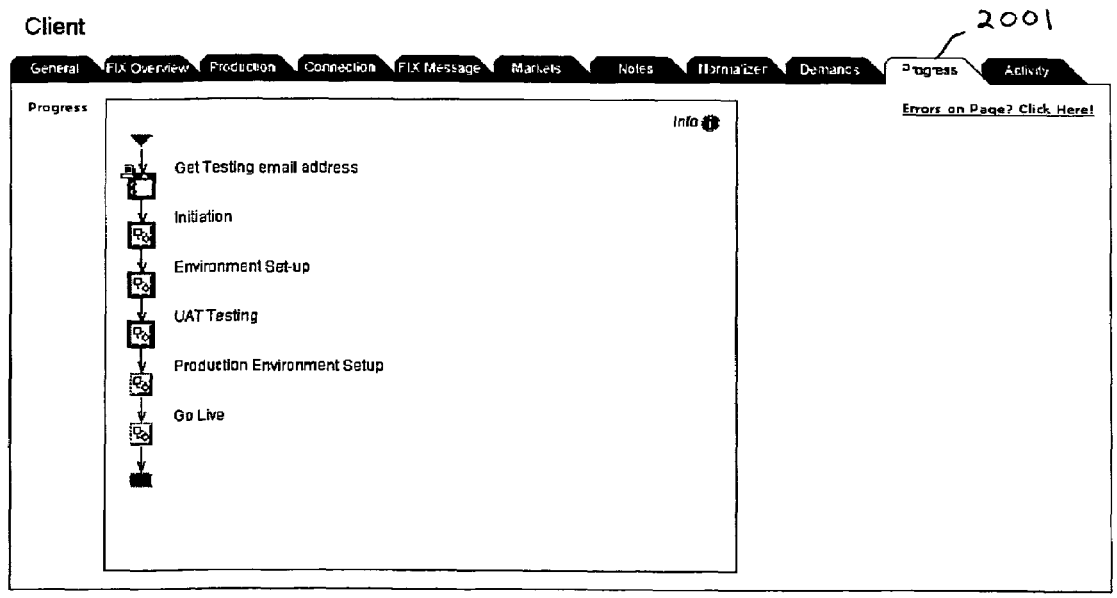
FIG. 20 illustrates a portion of a client page of the user-interface relating to a "Progress" tab.

If the current user has assigned tasks to complete for this client, two additional tabs are displayed on the Client page. With reference to FIGS. 20 and 21, the two additional tabs are the "Progress" tab 2001 and the "Activity" tab 2101. The "Progress" tab 2001, when selected, displays the CC process flow (FIGS. 4-10) and indicates the current status of the process by highlighting tasks that have been completed.

The "Activity" tab 2101 in FIG. 21, when selected, provides information about any manual tasks that have been assigned to the user by the workflow system 102. For example, if the current user has been assigned the task "setup client in production GTW," shown at 906 in FIG. 9, such task is shown at 2102 in FIG. 22 informing the user that he or she is responsible for completing the task. Once the task is complete, the user selects the "Complete Activity" button 2103. Selecting this button notifies the active workflow system 102 that the task is complete, so that processing can advance to the next task in the CC process, which in this example is "update percent complete" 907 in FIG. 9.

The user interface pertaining to client tests will now be described. Referring back to FIG. 12, when the "Client Tests" button 1208 is selected, the "Client Tests" dialog box illustrated in FIG. 22 is displayed. The dialog box of FIG. 22 lists all of the existing Client Tests to be executed at 802 in FIG. 8. The tests are listed row-by-row in window 2201. Information displayed for each test includes a test identifier, a status of the test, such as "run" or "not run," a run date and time, and the number of attempts that have been made to complete the test.

Figures 23, 24:
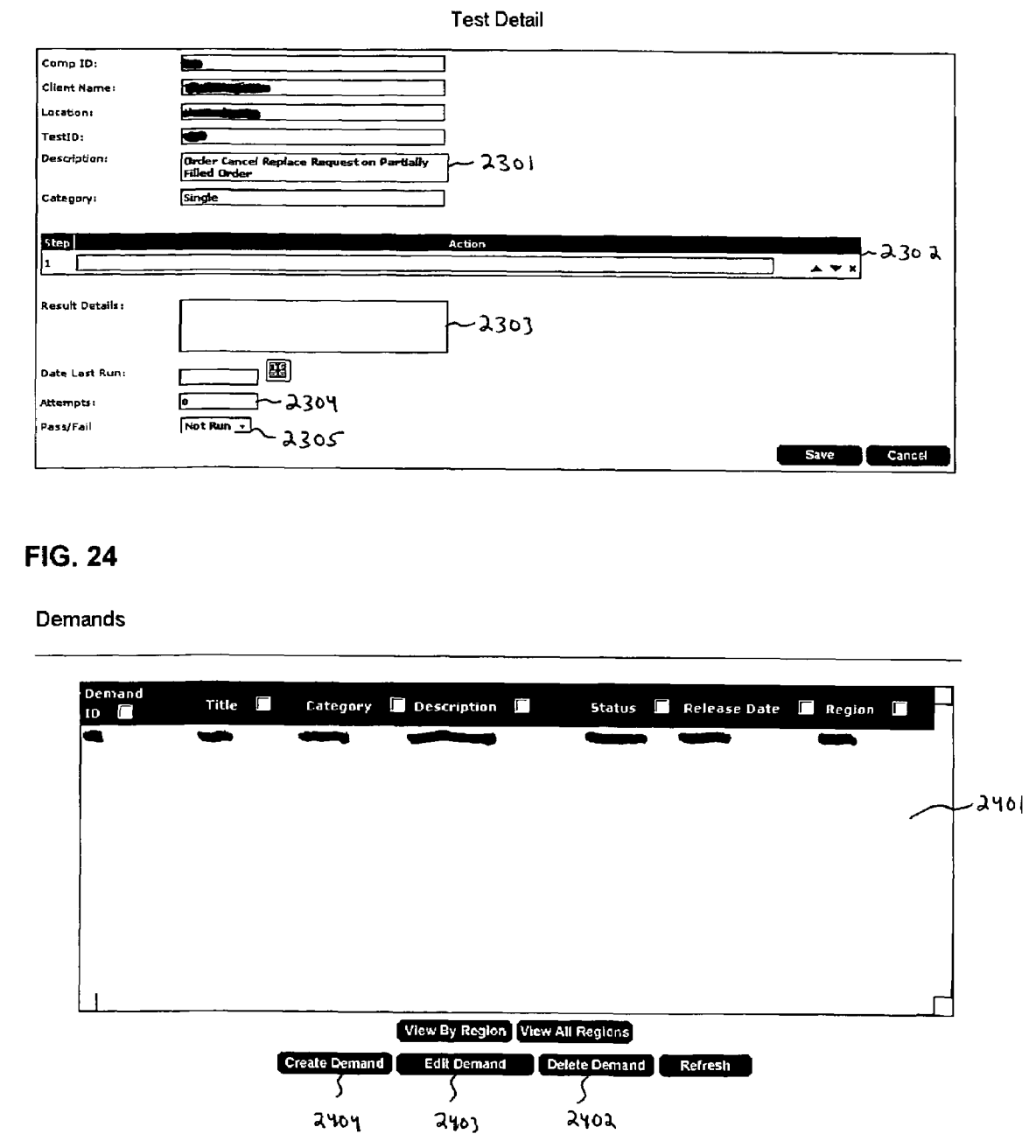

When the user selects one of the tests in the window 2201, a "Test Details" form is displayed, as illustrated in FIG. 23. The user may view and/or edit test details including a description of the test 2301, the tasks involved in completing the tests and their order of execution 2302, result details 2303, number of attempts made 2304, and whether the test passed or failed 2305.

Having completed the description of the "Client" page, which is accessed by selecting the "Client" link 1105 (FIG. 11), the "demands" page will now be described. The demands page is accessed by selecting the "demands" link 1106 (FIG. 11) from the navigation bar 1101. The demands page is illustrated with FIG. 24, from which the user can view, create, edit, and delete demands. Existing demands are listed row-by-row in the window 2401.

A demand may be deleted by selecting a demand and then selecting the "Delete Demand" button 2402. A demand may be edited by selecting a demand and then selecting the "Edit Demand" button 2403. And, a demand may be created by selecting the "Create Demand" button 2404.

When selecting either the "Edit Demand" button 2403 or the "Create Demand" button 2404, the "Client Demand" page illustrated with FIG. 25 is displayed. If the "Edit Demand" button 2403 is selected, the "Client Demand" page is shown filled with the information pertaining to the selected demand. If the "Create Demand" button 2404 is selected, a new "Client Demand" page is displayed.

The "Client Demand" page is a form that allows the user to view and/or enter information about a demand, including a description of the demand 2501, impacts of the demand 2502, the demand priority 2503, a status of the demand 2504, manual workarounds 2505, and clients affected by the demand 2506. The user may also attach documents 2507 to the demand. After the user enters the information in the "Client Demand" page, the user selects the "Add/Save" button 2508 to complete the creation of the new demand or accept the changes made to an existing demand.

Figure 26:
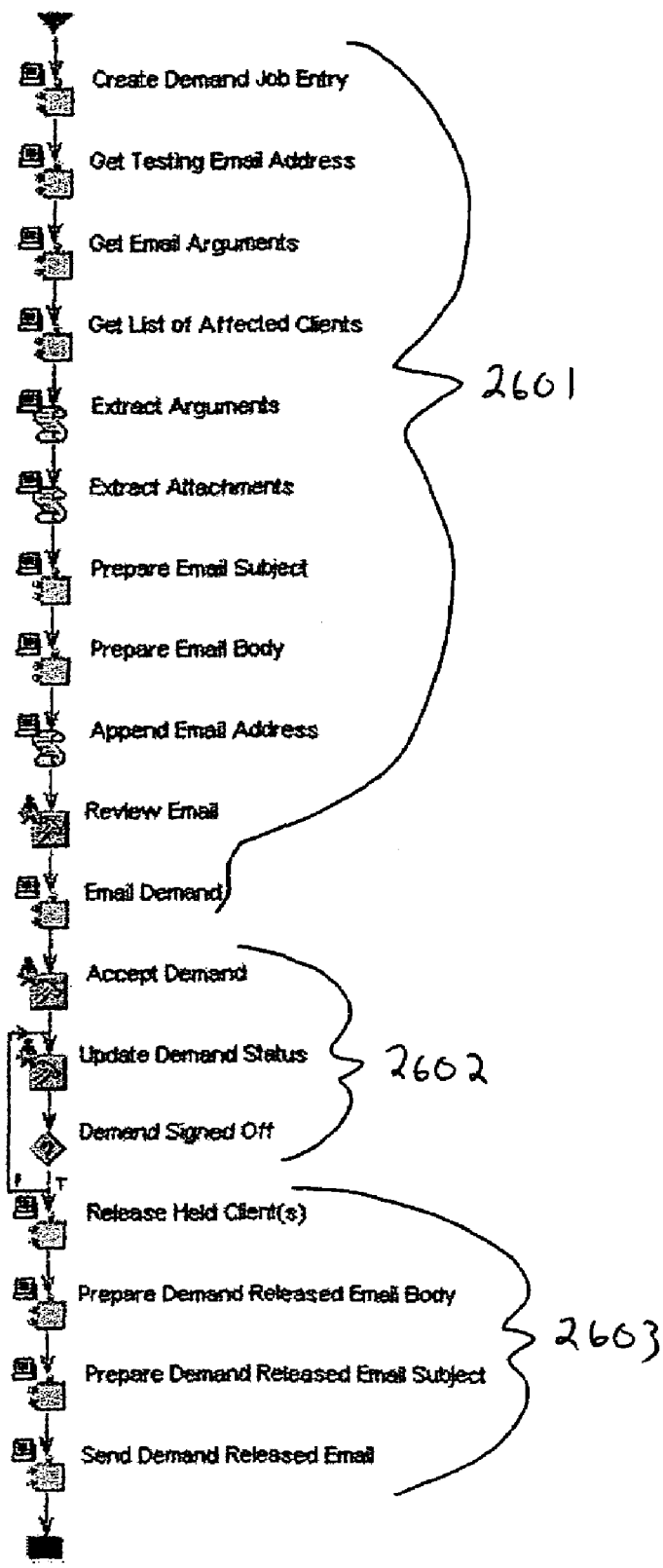
FIG. 26 illustrates a "Demand Raised" business process map that relates to creating a demand as described with reference to FIG. 25.

Once a demand has been created an instance of a Demand Raised subprocess is created, as illustrated in FIG. 26. This subprocess notifies responsible individuals on the on-boarding team 104, as shown at 2601, obtains approval of the demand from particular individuals on the on-boarding team 104, as shown at 2602, and releases the demand at 2603, when approved. Release of the demand means that the workflow system 102 modifies the CC process to include the tasks associated with resolving the demand. The manual tasks required to resolve the demand are delegated to the appropriate individuals on the on-boarding team 104, FCR team 106, or LVC team 107 as previously discussed. The workflow system 102 ensures that these tasks have been completed when the demands outstanding subprocess occurs, such as at 505 in FIG. 5.

Having concluded the description of the "Demands" page, which is accessible via the "Demands" link 1106 in FIG. 11, the "Normalizer" page will now be described. The "Normalizer" page is accessible via the "Normalizer" link 1107 shown in FIG. 11. Once this link is selected, the "Normalizer" page is displayed, which is illustrated with FIG. 27. The "Normalizer" page allows the user to view, edit, create, and delete normalizers.

Existing normalizers are displayed in the window 2701 in row format. A normalizer may be deleted by selecting a normalizer and then selecting the "Delete Normalizer" button 2702. A normalizer may be edited by selecting a normalizer and then selecting the "Edit Normalizer" button 2703. A normalizer may be created by selecting the "Create Normalizer" button 2704.

By selecting either the "Edit Normalizer" button 2703 or the "Create Normalizer" button 2704, the "Client Normalizer" page is displayed, which is illustrated with FIG. 28. On this page, the user may view and/or enter data pertaining to the normalizer including the name of the field that requires data translation 2801, a FIX tag name of the affected field 2802, the status of the normalizer 2803, such as "build," the actions involved in executing the normalizer 2804, and the clients affected by the normalizer 2805. Once the information has been entered, the user may select the "Add/Save" button 2806 to complete the changes. Any changes to the normalizers are recorded during the CC process, as shown for example, at 602 in FIG. 6.

Having completed the description of the "Normalizer" page, which is accessed from the "Normalizer" link 1107 shown in FIG. 11, the "Work queue" page will be described, which is accessed via the "Work queue" link 1109. The "Work queue" page is illustrated with FIG. 29. This page displays a list of activities that need to be completed for a particular client 105. Contrary to the "Activity" tab described with reference to FIG. 21, the "Work queue" page displays all outstanding manual tasks for a particular client, instead of just the tasks assigned to a particular user. From the "Work Queue" page, the user can take on an assigned activity by selecting button "Take Activity" 2901, and/or can mark an activity as complete by selecting button "Complete Activity" 2902. By allowing the user to take on someone else's task, work loads can be managed on the fly in a simple manner. When a user takes on someone else's task, such task shows up on his or her "Activity" form (FIG. 21).

Having completed the description of the "Work queue" page, the "Client Monitor" page will be described, which is accessed via the "Monitor" link 1112 illustrated with FIG. 11. The "Client Monitor" page, illustrated with FIG. 30, displays all clients for the selected region and their status. The information that is displayed for each client includes a color-coded status 3001, a client name 3002, a text based status 3003, a percentage complete 3004, and an expected CC process completion date 3005. Although the color-coded status 3001 can use any number of colors to represent any sort of status, the exemplary embodiment uses three colors to indicate three different statuses. A first color 3006 indicates that the client connect process is in production without outstanding issues or demands. A second color 3007 indicates that the process is in a subprocess other than production without issues or demands. And, a third color 3008 indicates that there are outstanding issues or demands in the client connect process. In the exemplary embodiment, the first color is green, the second color is yellow, and the third color is red.

Figure 5:
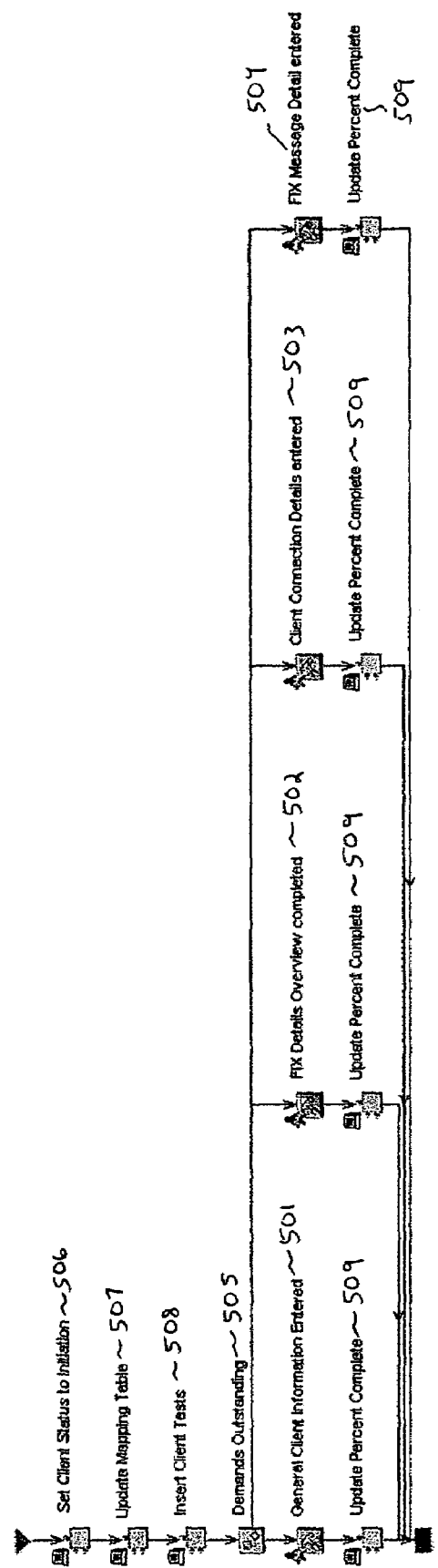
FIG. 5 illustrates the initiation process flow shown in FIG. 4.

The status field 3003 displays the client status that was discussed with respect to the process maps in FIGS. 4-10 (506 in FIG. 5, for example.) The percent complete field 3004 displays the percent complete that was also discussed with respect to FIGS. 4-10 (509 in FIG. 5, for example.)

It is to be understood that the above-described embodiment is merely illustrative of the present invention and that many variations of the above-described embodiment can be devised by one skilled in the art without departing from the scope of the invention. It is therefore intended that such variations be included within the scope of the following claims and their equivalents.

What is claimed is:

1. A system for providing a client access to a secured service, the system comprising:
a computer-readable memory storing a process flow comprising a plurality of tasks associated with providing access to the secured service, the plurality of tasks comprising automatic tasks and at least one manual task, the plurality of tasks further comprising tasks pertaining to transmitting connection information to the client and communicating with a network provider that provides a network external to the secured service;
a manual task computer associated with an individual responsible for executing the manual task;
a process management system communicatively connected to the computer-readable memory and the manual task computer, the process management system advancing through the plurality of tasks in the process flow by performing actions comprising:
(i) instructing automatic execution of a first automatic task when due for execution;
(ii) transmitting, after the execution of the first automatic task, a message to the manual task computer indicating that the manual task is due for execution;
(iii) receiving at the process management system, prior to advancing to a second automatic task, an indication from the manual task computer that the manual task is complete; and
a demand creation computer that transmits a demand to the process management system while the process management system is advancing through the plurality of tasks in the process flow, the demand indicating a problem encountered while creating a connection between the client and the secured service that must be rectified to provide the client access to the secured service, wherein the process management system performs actions further comprising:
(i) receiving the demand from the demand creation computer; and
(ii) inserting a new task into the process flow, the new task associated with rectifying the problem.

2. The system of claim 1 wherein the secured service is provided by a computer system that allows the client to trade financial instruments.

3. The system of claim 1, wherein the new task is a new manual task, and the system further comprises: a second manual task computer associated with an individual responsible for executing the new manual task, the second manual task computer communicatively connected to the process management system, wherein the process management system is programmed to perform actions further comprising:
transmitting, when the new manual task is due for execution, a message to the second manual task computer indicating that the new manual task is due for execution; and receiving, prior to advancing the process flow, an indication from the second manual task computer that the new manual task is complete.

* * * * *